May 21, 1935.    H. C. FIELD    2,001,778
WINDOW ASSEMBLY FOR AN AUTOMOTIVE VEHICLE
Filed March 23, 1933    2 Sheets-Sheet 1
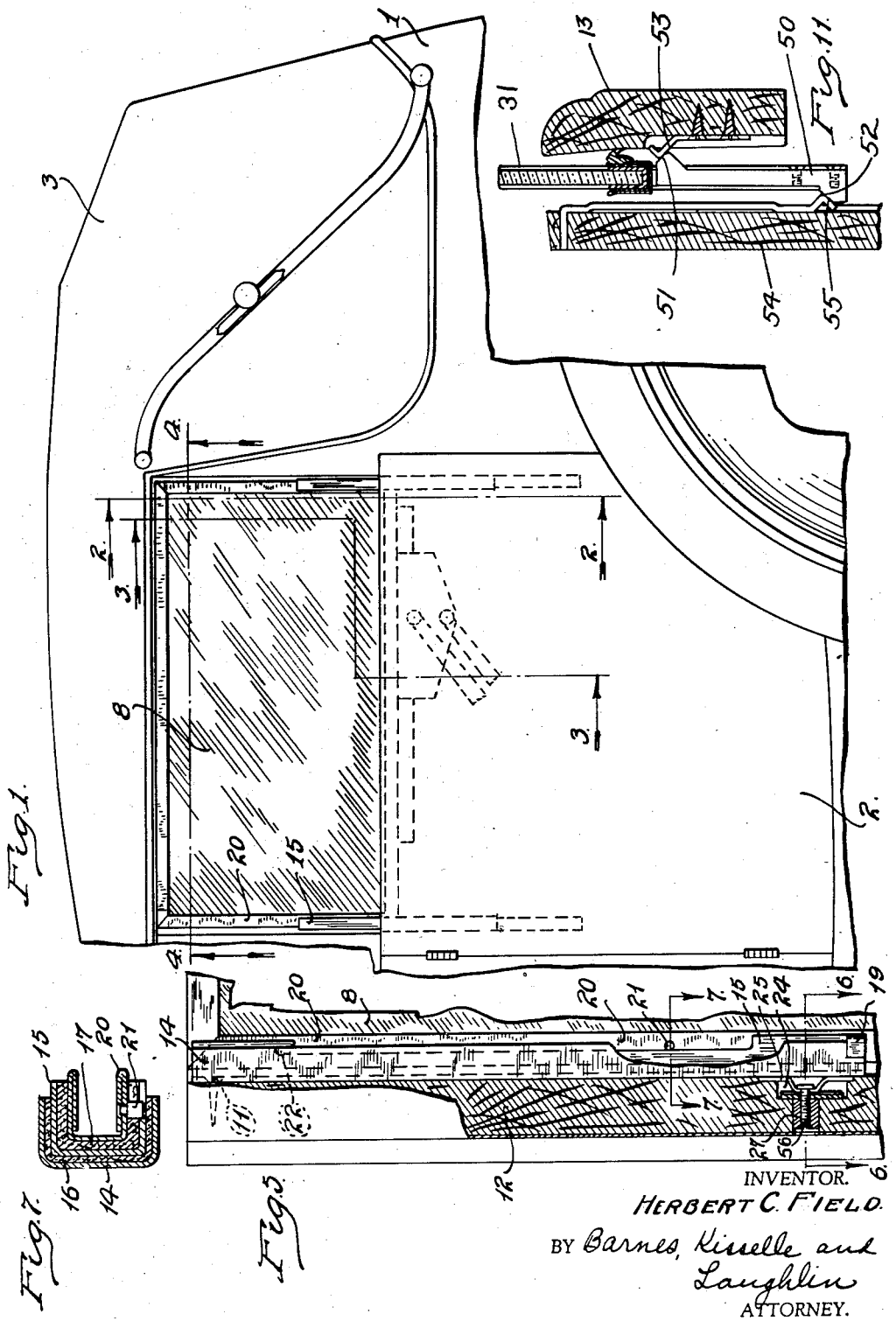
INVENTOR.
HERBERT C. FIELD.
BY Barnes, Kisselle and Laughlin
ATTORNEY.

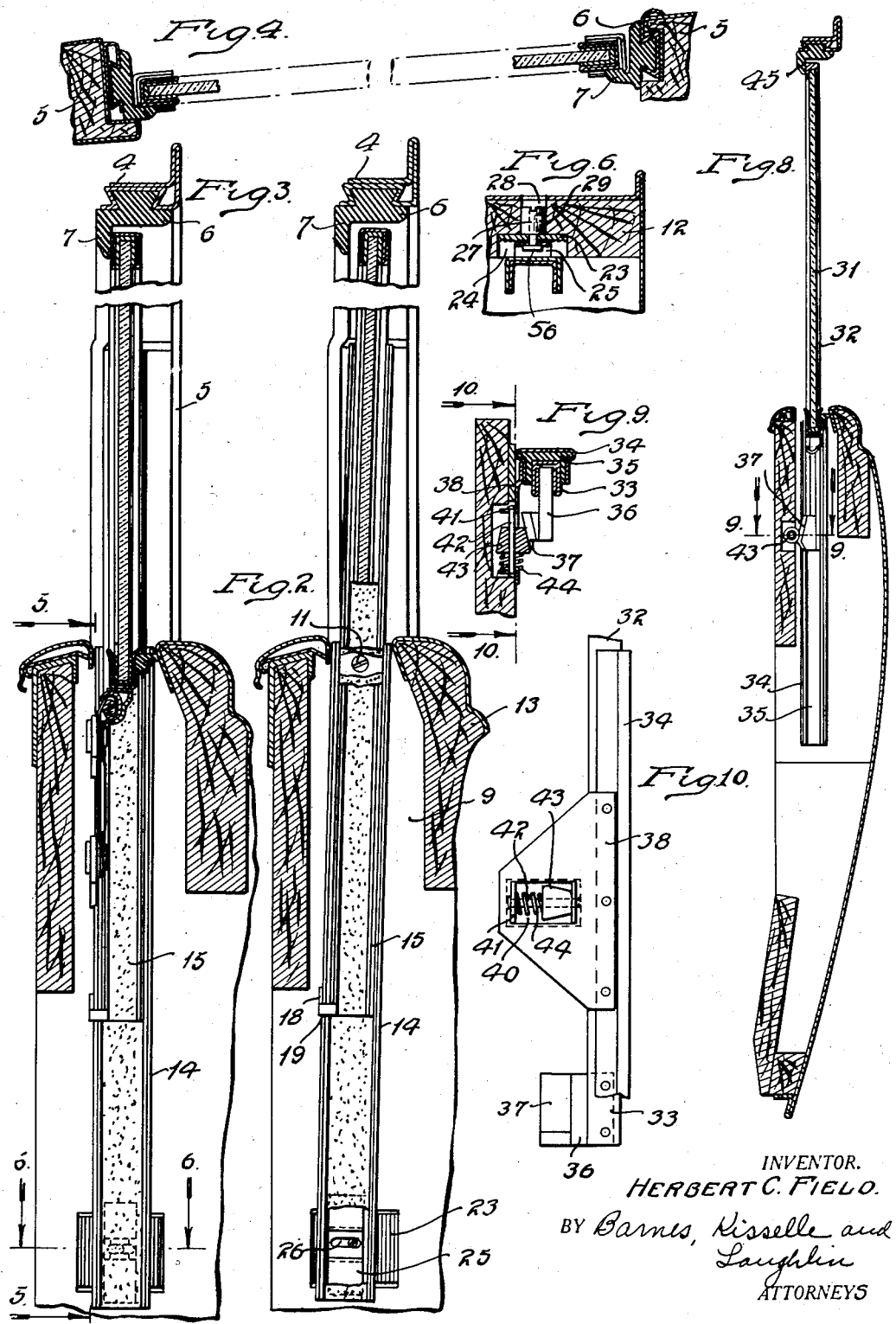

Patented May 21, 1935

2,001,778

UNITED STATES PATENT OFFICE 2,001,778

WINDOW ASSEMBLY FOR AN AUTOMOTIVE VEHICLE

Herbert C. Field, Windsor, Ontario, Canada, assignor to Ternstedt Manufacturing Company, Detroit, Mich., a corporation of Michigan Application March 23, 1933, Serial No. 662,217

4 Claims. (Cl. 296—48)

This invention relates to a window assembly for an automotive vehicle, and more particularly with that type of window assembly wherein the window is not guided above the belt, such as in the all-weather type of vehicle body where the top may be optionally raised and lowered.

In this type of vehicle body having an all-weather top, the body pillars are made in two sections, the section above the belt being demountable. In such a top the header against which the upper edge of the window abuts is likewise demountable with the top. In such an all-weather top the header and demountable pillar portions are provided with weatherstrips which seal the window against the weather when the window is raised and the door closed, but the weatherstrips do not serve to guide the window as it is raised and lowered, or support the window when in raised position. The window in this type of automotive vehicle having an all-weather top is usually guided below the belt or substantially so.

It is an object of this invention to produce a window assembly for an automotive vehicle in which the window panel may be pivoted at the belt to effect a better sealing engagement with the weatherstrip when the window is in raised position and the door closed.

This invention further contemplates a window assembly for an automotive vehicle in which the window channel guide is pivoted approximately at the belt so that the channel may be swung on this pivot to effect a weather-tight seal between the window panel and the weatherstrip.

A further object of the invention is to produce a window assembly for an automotive vehicle in which the window channel guide is pivoted at the belt and provided with anchoring means below the pivot which are accessible through the door pillar for anchoring the pivoted channel guide in a predetermined position.

This invention further contemplates a window assembly for an automotive vehicle in which the window panel fulcrums at the belt and is pivoted automatically inwardly of the vehicle body above the belt as the window is raised to window closing position.

In the drawings:

Fig. 1 is a fragmentary side elevation of an automotive vehicle having an all-weather top showing the window in raised and closed position.

Fig. 2 is a section along the line 2—2 of Fig. 1 showing the window panel prior to being pivoted inwardly above the belt.

Fig. 3 is a section similar to Fig. 2 along the line 3—3 of Fig. 1 showing the window panel after the window portion above the belt has been pivoted inwardly of the body into sealing engagement with the weatherstrip.

Fig. 4 is a section along the line 4—4 of Fig. 1.

Fig. 5 is a section along the line 5—5 of Fig. 3.

Fig. 6 is a section along the line 6—6 of Fig. 5.

Fig. 7 is a section along the line 7—7 of Fig. 5.

Fig. 8 is a vertical section through the door and window panel showing a modified form of the window assembly.

Fig. 9 is a section along the line 9—9 of Fig. 8.

Fig. 10 is a section along the line 10—10 of Fig. 9.

Fig. 11 is a vertical section through the door and window panel showing another modified form of the window assembly.

Referring more particularly to the drawings, there is shown an automotive vehicle body 1 having the door 2 and provided with an all-weather top 3. Since the top portion 3 is an all-weather top which may be raised and lowered as desired, the members defining the window opening, that is, the header 4 and the pillars 5 are demountable, that is they may be lowered with the top. The header 4 and demountable pillar portions 5 carry the weatherstrip 6 which is provided along its inner edge with the projecting lip 7 which engages the edge portion of the inner face of the window panel 8 when the panel is raised and the door 2 closed.

Since the window 8 is carried by the door 2, it swings with the same, and since the demountable pillar portions 5 are a portion of the body, the window panel 8 must be guided as it is raised and lowered by means carried by the door. To this end the window well 9 of the door is provided with a guide channel 14 along each side. Each of the guide channels 14 is pivoted as at 11 to a door pillar 12. The pivot 11 is preferably positioned adjacent the top of the window well and in the region of the belt rail 13. The channel 14 receives another channel member 15 which has a telescopic slidable engagement with the channel 14. The glass panel 8 is provided with a sash 20 which in turn has a telescopic slidable engagement with channel 15. As shown in Fig. 7, the channel 14 has a lining of felt 16 and the channel 15 is also provided with a felt lining 17. The channel 14 is provided with a stop 18 and the lower end of the channel 15 is provided with a corresponding stop member 19 which, as shown in Fig. 2, abuts against the stop 18 to limit the upward movement of the channel 15. The glass panel sash 20 carries the lug 21. As the window panel 8 is being raised, the lug 21 engages the notch 22 in the channel member 15 thereby causing the channel member 15 to slide upwardly in the channel member 14. As shown in Figs. 2 and 3, when the window panel 8 is raised the channel 15 extends into the window well and serves as an extension of the sash 20 and since the channel 15 is guided in channel 14, it supports the panel 8 below the belt and holds the panel 8 in vertical position.

Since it is not always possible to accurately align the window panel above the belt relative to the weatherstrip so that a proper weathertight seal will be effected, it is desirable that the portion of the panel above the belt be easily adjustable inwardly or outwardly of the window opening. Hence, to this end each window channel guide 14 is pivotally supported near its upper edge on the door post 12 by the screw 11, as above described, and the lower portion of the channel 14 is provided with an adjustable anchor comprising a serrated anchor plate 23 which is preferably located in a recess 24 in the inner face of the pillar 12. The outer face of the base of the channel 14 has secured thereto the retainer member 25 provided with an elongated opening 26. The retainer member 25 is provided with a headed screw 56 (Fig. 6) which projects through an opening in the anchor plate 23 and carries a nut 27. The nut 27 is accessible through an opening 28 from the outer face of the pillar 12. Hence, to adjust the panel 8 inwardly or outwardly of the window opening to effect a proper seal with the lip 7 of the weatherstrip, it is only necessary to open the door whereupon the outer face 29 of the door pillar becomes exposed thus permitting one to turn the nut 27 by means of any suitable tool such as a screw-driver which may be inserted in the opening 28 and thus release the retainer 25 from the anchor plate 23. At this time the window can be pivoted inwardly, in case one desires to adjust it inwardly, about its pivot 11 because the channel 14 is free to move relative to the screw 56 because of the elongated opening 26. As soon as the window has been pivoted to the position desired, the nut 27 may again be turned down thus securing the retainer 25 to the anchor plate 23 to effectively hold the window in its adjusted position.

Hence, from the above description, it will be seen that the window panel 8 may be readily adjusted above the belt either inwardly or outwardly of the window opening to effect the proper weather seal with the weatherstrip, and that this adjustment is easily accomplished even after the window is assembled in the window opening because the adjusting mechanism is accessible through the outer face of the door pillar.

In the modified form of the invention, the vertically slidable window panel 31 is provided with a sash channel 32 along each upright edge which has an extension 33 below the lower edge of the window glass panel. The extension 33 differs from the channel extension 15 of the principal form of the invention because it is fixed relative to channel 32 and does not move along the same. The side edges of the window are guided below the belt by the guide channels 34 having the flexible lining 35 (Fig. 9) of felt, stiff pile, fabric covered rubber or any other suitable material. Each of the window sash extensions 33 have secured thereto a plate 36 which supports a cam 37. The cam 37 has its face inclined upwardly and outwardly of the window opening, as shown in Fig. 8. The window guide channel 34 has spot welded or otherwise secured thereto the plate 38 which is provided with an opening 40 having at each end an inwardly turned ear 41. The inwardly turned ears carry a pin 42 upon which is mounted a conical roller 43 spring loaded by the coil spring 44. The roller is rotatably mounted on the pin 42 and free to move axially along the same. The window 31 may be raised and lowered by any of the well-known window regulators. As shown in Fig. 8, as the window is raised to closed position the cam 37 engages the conical roller 43 and causes the window panel above the belt to tilt inwardly of the window opening into weather-tight sealing engagement with the weatherstrip 45. The flexible lining 35 in the channel 34 permits the window panel 31 to fulcrum at the belt and tilt inwardly when the cam 37 engages the roller 43.

In the modified form shown in Figure 11, the window 31 is in all respects similar to the modified form shown in Figure 8, being guided only below the belt in a guide channel having a felt, stiff pile, or other flexible lining, and provided with sash extensions which support the window when in raised position. In this modified form the lower sash of the window is provided with a bracket 50 which is provided along its upper edge with the cam 51 and along its lower edge with a cam 52. The inner face of the belt rail 13 is provided with a cam surface 53 which cooperates with the cam 51 and the lock board 54 carries a plate having a cam surface 55 which cooperates with the cam surface 52. Hence, since the window 31 is guided only below the belt in the window guide channels which are lined with a flexible lining, when the window panel is raised to closed position the cam surface 51 on the bracket 50 slidably engages the cam surface 53 carried on the inner face of the belt rail 13 and thus tends to cam the lower edge of the window inwardly of the body, or to the left as viewed in Figure 11, and at the same time the cam face 52 at the lower edge of the bracket 50 engages the cam surface 55 which cams the lower edge of the bracket 50 outwardly or to the right about the cam face 53 as a fulcrum which in turn throws the upper edge of the window panel 31 inwardly into sealing engagement with the weatherstrip 45. Hence, in this modified form of the assembly as the window is raised to closed position, the cooperating cam surfaces 51, 53, and 52, 55 move the window panel 31 bodily inwardly of the window opening into better sealing engagement with the weatherstrip.

I claim:

1. A window assembly for an automotive vehicle of the type having an opening and a window well beneath the said opening comprising a window panel for closing the window opening when in raised position and arranged to retreat into the window well, a weatherstrip mounted in the window opening for sealing the edges of the window panel when in raised position, a guide channel for each of the vertical edges of the panel positioned entirely within the window well for guiding the panel below the belt, a flexible lining for the guide channel, a sash for each of the vertical edges of the window, and an extension for the sash projecting beneath the lower edge of the window panel, a cam plate carried by each sash projection, and means mounted in the upper portion of the window well for engaging the cam plate as the window is raised to closed position for tilting the window inwardly of the window opening into sealing engagement with the weatherstrip.

2. A window assembly for an automotive vehicle of the type having an opening and a window well beneath the said opening, comprising a window panel for closing the window opening when in raised position and arranged to retreat into the window well, a weatherstrip mounted in the window opening for sealing the edges of the window panel when in raised position, a guide channel for each of the vertical edges of the panel positioned entirely within the window well for guiding the panel below the belt, a flexible lining for the guide channel, a sash for each of the vertical edges of the window, an extension for the sash projecting beneath the lower edge of the window panel, a cam plate carried by each sash projection, and a roller mounted in the upper portion of the window well for engaging the cam plate when the window panel is raised to closed position for tilting the window panel inwardly into sealing engagement with the weatherstrip.

3. A window assembly for an automotive vehicle of the type having an opening and a window well beneath the said opening comprising a window panel for closing the window opening when in raised position and arranged to retreat into the window well, a weatherstrip mounted in the window opening for sealing the edges of the window panel when in raised position, a guide channel for each of the vertical edges of the panel positioned entirely within the window well for guiding the panel below the belt, a flexible lining for the guide channel, a sash for each of the vertical edges of the window, and an extension for the sash projecting beneath the lower edge of the window panel, vertically spaced cam surfaces carried by the lower edge of the window panel and vertically spaced cam surfaces mounted on opposed walls of the window well for cooperating with the spaced cams carried by the window, the upper cooperating cams tending to move the lower portion of the window inwardly when the window is raised to closed position, and the lower set of cooperating cams tending to tilt the window inwardly of the window opening about the upper set of cams as a fulcrum when the window is raised to closed position.

4. A window assembly for an automotive vehicle of the type having an opening and a window well beneath the said opening comprising a window panel for closing the window opening when in raised position and arranged to retreat into the window well, a weatherstrip mounted in the window opening for sealing the edges of the window panel when in raised position, a guide channel for each of the vertical edges of the panel, a sash for each of the vertical edges of the window panel, each sash having an extension projecting beneath the lower edge of the window panel, and cooperating cam members mounted upon the sash projections and the upper portion of the window well which engage as the window panel is raised to closed position for tilting the window inwardly of the window opening into sealing engagement with the weatherstrip.

HERBERT C. FIELD.